Aug. 25, 1936.  J. H. DE MURGUIONDO  2,052,105

VEHICLE DIRECTION INDICATOR

Filed March 21, 1936

Inventor
Jose H. de Murguiondo

Seymour & Bright
Attorneys

Patented Aug. 25, 1936

2,052,105

UNITED STATES PATENT OFFICE 2,052,105

VEHICLE DIRECTION INDICATOR

Jose H. de Murguiondo, Cooksville, Md., assignor to Amalia de Murguiondo Riggs, Cooksville, Md.

Application March 21, 1936, Serial No. 70,158

2 Claims. (Cl. 177—329)

This invention relates to direction indicators and more especially to novel means for indicating the direction in which an operator of an automobile or the like intends to turn.

One of the objects of the invention is to provide indicating mechanism which will normally be concealed and housed within the vehicle or a suitable casing to protect the elements from the weather.

Another object is to furnish mechanism for this purpose which will be of simple and inexpensive construction and which may be controlled by the use of switches or the like.

A still further object is to supply a direction indicator which may be actuated from the electric battery of the automobile and may be controlled by hand-operated switches arranged on the steering wheel or in some other position readily accessible to the operator of the vehicle.

With the foregoing objects outlined and with other objects in view which will appear as the description proceeds, the invention consists in the novel features hereinafter set forth in detail, illustrated in the accompanying drawing, and more particularly pointed out in the appended claims.

Figure 1:
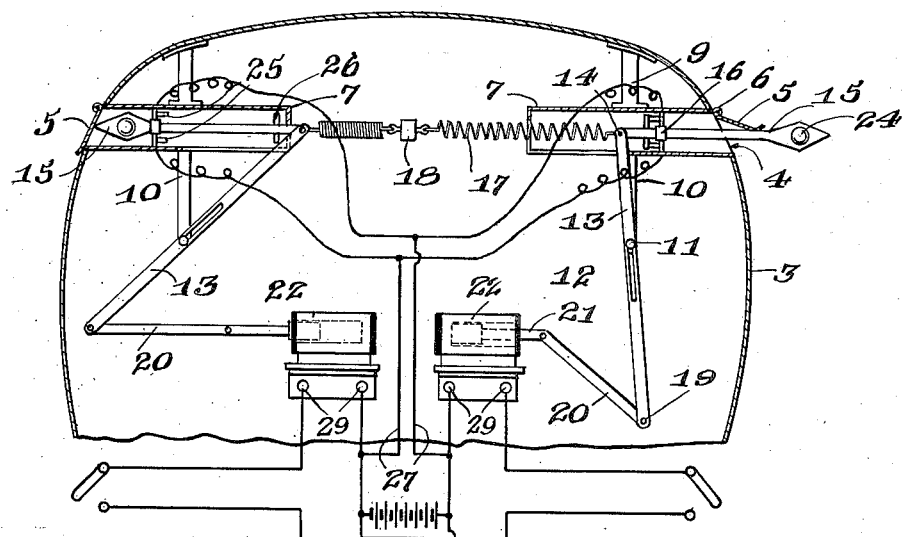
Fig. 1 is a vertical sectional view of a portion of an automobile taken on the line 1—1 of Fig. 2 and showing one form of my improved mechanism.
Figure 2:
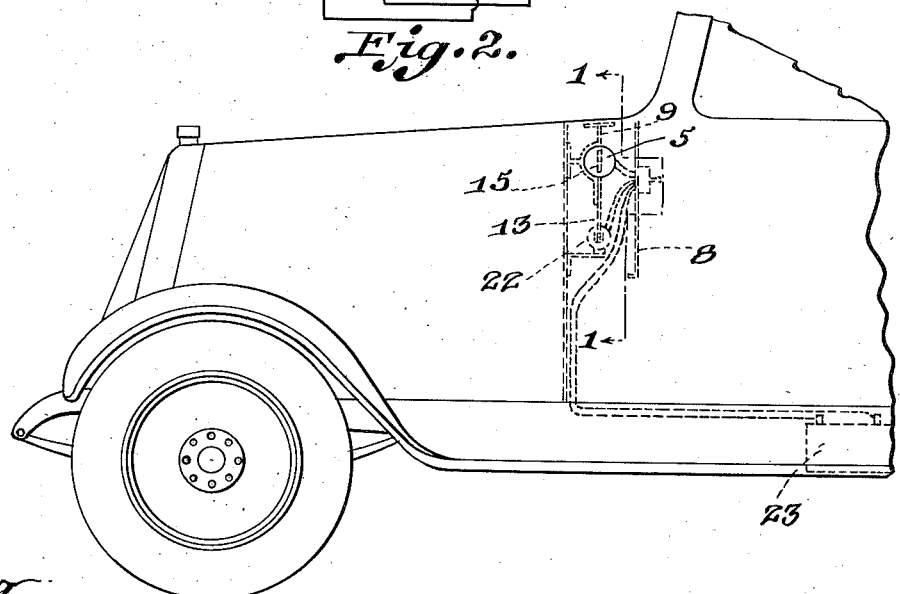
Fig. 2 is a side elevation of a portion of an automobile equipped with my mechanism.
Figure 3:
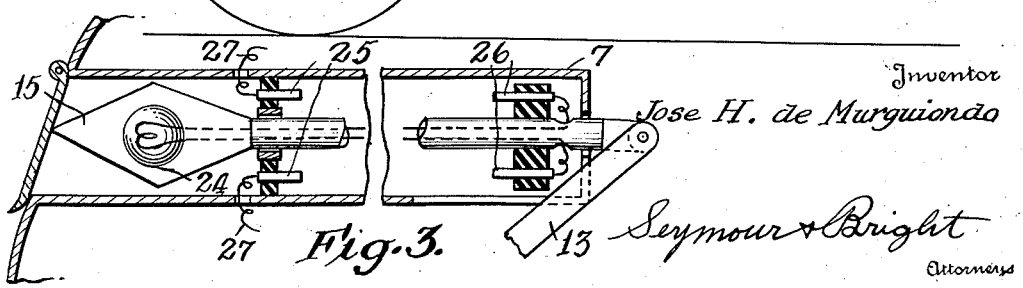
Fig. 3 is a longitudinal vertical sectional view of a detail.

Referring to the embodiment of the invention illustrated in Figs. 1, 2 and 3, the reference numeral 3 designates an automobile hood having at opposite sides thereof ports or openings 4 which are normally closed by doors 5 having spring hinges 6. A pair of tubes 7 are arranged within the hood forwardly of the instrument board 8 so that they will be concealed from the view of the occupants of the automobile. Each of these tubes is mounted on a bracket 9 having a depending arm 10 carrying a pin or stud 11, which passes through a slot 12 in a lever 13. The upper end of the lever is pivotally connected at 14 to the inner end of an arrow 15 which is slidably mounted in a bearing 16 arranged within the tube. Springs 17 connect the inner ends of the arrows to a stationary bracket 18 and these springs normally tend to hold the arrows in retracted position. For the purpose of projecting the arrows, the lower end of each lever is pivotally connected at 19 to one end of a link 20; the other end of the link being connected to the movable member 21 of an electromagnet 22. These magnets can be supplied with current, through the contacts 29 thereof by the battery 23 of the car and by the use of suitable control switches either arrow may be projected independently of the other.

Referring to Fig. 3, it will be seen that for the purpose of flashing on an electric lamp 24 on each arrow, the bearing member 16 is provided with a pair of stationary contacts 25 which are bridged by movable contacts 26 when the arrow is in projected position. Wires 27 lead current from the battery to the stationary contacts 25 and it is evident that when an arrow is projected the lamp on this arrow will be automatically lighted as soon as the movable contacts engage or abut against the stationary contacts 25.

In operation, whenever the operator of the vehicle intends to make a turn, he will actuate the switch controlling the arrow that is to be projected at that side of the vehicle. This, as may be seen from Figs. 1 and 3, will result in energizing the proper electromagnet 22 and the swinging of the lever 13. This causes the arrow to be projected and when the arrow reaches its outermost position, the contacts 26 will abut against the contacts 25 thereby close the circuit from the battery to the lamp and cause the lamp on that particular arrow to be illuminated.

Of course, when the current is released, the spring 17 will return the arrow to its retracted position within the casing.

While I have disclosed what I now consider to be preferred embodiments of the invention, it is manifest that changes may be made in the details without departing from the spirit of the invention as expressed in the claims.

What I claim and desire to secure by Letters Patent is:

1. A vehicle direction indicator comprising a relatively small port in the side of a vehicle, a tubular casing in the vehicle having its mouth communicating with said port, a bearing positioned within the medial portion of the casing, a rod slidably mounted in said bearing and having a direction indicating member at its outer end, a spring connected to the rod for normally holding the latter in retracted position, a pivot pin positioned exteriorly of the casing and having its axis arranged longitudinally of the vehicle, a lever shiftable laterally of the vehicle and having a slotted portion engaging said pin, means connecting one end of the lever to said rod, a solenoid positioned parallel to the casing and having a movable member, and a link pivotally connecting the movable member to the other end of said lever.

2. In a vehicle direction indicator, a relatively small port in the side of a vehicle, a horizontally disposed tubular casing within the vehicle and having its mouth communicating with said port, a bearing member arranged within the medial portion of said casing, a rod slidably mounted in the bearing member and having an indicating member at its outer end, an electric lamp arranged in said indicating member, electric contacts on the bearing member in electrical connection with said lamp, a contact member secured to the rod and engageable with the contacts of the bearing member when the rod is moved forwardly to project the indicating member through said port, means for leading electric current to said contact member, and means for projecting and retracting said rod.

JOSE H. DE MURGUIONDO.